Jan. 2, 1968 D. JOHNSTON 3,361,357
CENTRIFUGAL METERING SYSTEM FOR AGRICULTURAL LIQUIDS
Original Filed Oct. 23, 1963
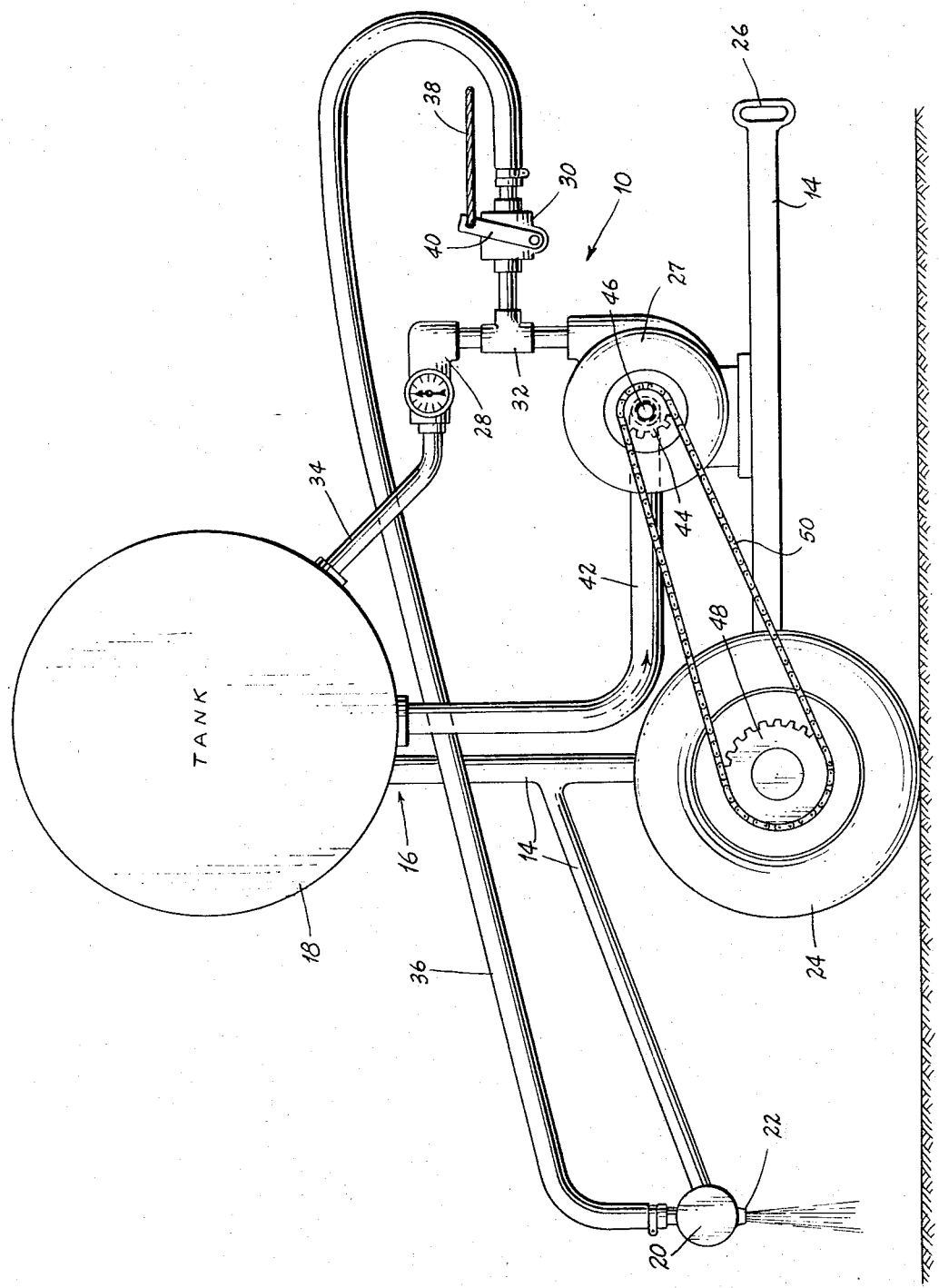
INVENTOR:
DOUGLAS JOHNSTON,
BY Kingsland, Rogers, Ezell & Robbins
ATTORNEYS United States Patent Office 3,361,357
Patented Jan. 2, 1968

3,361,357
CENTRIFUGAL METERING SYSTEM FOR AGRICULTURAL LIQUIDS
Douglas Johnston, Athens, Ala., assignor to Decatur Foundry & Machine Co., Inc., Decatur, Ala., a corporation of Alabama
Continuation of abandoned application Ser. No. 318,325, Oct. 23, 1963. This application July 11, 1966, Ser. No. 564,427
5 Claims. (Cl. 239—127)

ABSTRACT OF THE DISCLOSURE

A system of dispensing liquid agricultural chemicals and the like comprising a source of supply of such chemicals, as in a tank, and orifices for discharging such chemicals, as a boom with orifices, a vehicle for moving said source and orifices over a terrain, as by a wheeled vehicle, and a centrifugal structure, as a centrifugal pump positively connected to a wheel, or the like, of the vehicle for rotation thereof in a direct ratio for dispensing such chemicals at rates proportional to the terrain speeds of the source and orifices by providing a continuous supply of such chemicals at and maintaining a pressure on the orifices proportional to the second power of such ground speed, so that the same amount of such liquid chemicals is spread over each increment of terrain regardless of the terrain speed of the source. A bypass from the discharge side of the centrifugal structure to the tank in which is disposed a calibrated valve, the bypass having free discharge, is provided.

---

The present application is a continuation of applicant's prior copending application Ser. No. 318,325, filed Oct. 23, 1963, now Patent No. 3,280,071.

The present invention relates generally to the agricultural art, and more particularly to a novel centrifugal metering system for applying to and into the ground agricultural liquids, such as fertilizer, insecticides, herbicides, etc.

As applied to the application of agricultural chemicals, such as liquid fertilizers, insecticides, herbicides, etc., the term "metering pump" is generally taken to mean a pump that may be set to apply the solutions at any speed, at a preset amount per acre. For example, if the rate were such that the pump were set to apply four and one-half gallons per minute at four and one-half miles per hour, it would apply three gallons per minute at three miles per hour, or six gallons per minute at six miles per hour, maintaining a constant preset rate per acre, regardless of speed.

The advantages of a metering pump, as against the usual fixed pressure-orifice system, are fairly obvious. Errors caused by inadvertent speed variations are eliminated. A great many more acres may be covered in a given time if the operator is allowed to select his speed to suit terrain and practical operating conditions, rather than be limited to a selected speed that may be too fast in some areas and too slow in others.

In hilly locations, it is frequently necessary to go up a hill in low gear, especially with a full tank, but fully practical to change to third or fourth gear in descending.

Heretofore, the metering system generally used in applying liquid agricultural chemicals to the ground has incorporated a rotary pump, pressure regulator, and changeable orifices. This system, while workable under ideal circumstances, has many disadvantages. It is most difficult for a farmer to handle under field conditions. Application of the agricultural chemicals is often too heavy or too sparse.

Another method is the use of variable stroke reciprocating pumps, but these are complicated, expensive to maintain, require rugged ground wheel drives, and cannot handle gaseous solutions, as any gas in the cylinder prevents it from filling on the suction stroke, causing undermetering. These pumps cannot be used for insecticide application if agitation of the fluid in the tank is necessary, unless a mechanical agitator is employed. Further, reciprocating pumps surge severely, require rugged mounting brackets, and heavy chain drives, and usually contain one or two packing glands, four valves, and a piston cylinder that may be scored by abrasive materials, thereby requiring frequent replacement of these parts. Other approaches to the metering problem have been and are just as unsatisfactory. There has long existed the need for a metering system for agricultural chemicals which will overcome the many disadvantages existing in the metering systems employed at the present time.

Therefore, an object of the present invention is to provide a novel metering system for applying agricultural chemicals which overcomes the many disadvantages existing in the metering systems now employed for agricultural chemicals.

In brief, the applicant has provided a novel centrifugal metering system adapted for integration with a wheeled applicator which includes a centrifugal pump, an adjustable calibrated bypass valve, and a cutoff valve, there being a T-connector liquid conduit between the centifugal pump and the two valves. The cutoff valve is connected to a spray boom forming part of the applicator, or other means of applying the liquid chemicals to the ground or soil, as applicator knives. The bypass valve is connected back into the applicator tank from which the centrifugal pump takes the liquid chemicals, thereby achieving agitation. The centrifugal pump is connected on its intake side with the applicator tank holding the liquid agricultural chemicals. The centrifugal pump is driven by the applicator ground wheels through the medium of selected sprockets secured to the impeller of the pump and to the wheel and a suitable chain.

The pressure developed by a centrifugal pump varies as the square of the speed of ground wheels, while the capacity of output varies directly as the speed of ground wheels. That is, $P=K(S)^2$ where P is the pressure in p.s.i., and S is the speed, m.p.h., with the pump driven from the ground wheel, or maintaining a constant speed relationship with the ground wheel. K is simply a constant, depending upon the particular pump and the drive ratio.

The flow through a nozzle or orifice is proportional to the square root of the pressure. That is $Q=CA\sqrt{P}$, where Q is the flow in g.p.m., "A" the area, and "C" a constant, depending on the orifice coefficient.

If we substitute the value of "P," first above, for "P" in the second formula, we find that:

$$Q=C \times A \times K\sqrt{(S)^2}=Q=K_1SA$$

where $K_1$ is also a constant. We, therefore, see that the output from an orifice supplied by a ground driven centrifugal pump is proportional to the speed of ground wheels, and we have an accurate metering system.

If one selects a nozzle or orifice that gives him the output rate per acre he desires at his average operating speed, and at an average operating pressure, and sets his pressure correctly at the selected speed, then the same output per acre will prevail at any speed.

Operation under these conditions will result in accurate metering at all speeds, and it will be unnecessary to consider either speed or pressure.

The pressure on the orifices or nozzles is controlled and set, not by a pressure regulator, but by a bypass valve that returns that excess flow to the tank. The output of the pump is considerably in excess of any output requirement, and the bypass valve serves itself as an orifice, through which the flow is proportional to the speed.

The bypass return to the tank, while necessary for metering, also serves to agitate the fluid in the tank, and enables gaseous solutions, such as aqua ammonia, to be metered accurately as any entrained gas is returned to the tank.

The pump must be driven from the ground wheel, preferably by a light chain, or from a shaft that maintains a constant relation to the ground speed. The revolutions per minute of the pump will be equal to $N=KRS/L$ where S is speed in miles per hour, K is a constant, R is the drive ratio, revolutions of the pump per revolution of the ground wheel, and L is the loaded radius of the ground wheel or tire, inches.

Using a precision, calibrated bypass valve, a simple cardboard slide rule may be used to set the bypass valve for the correct output rate, without reference to a pressure gauge.

Factors needed for setting the slide rule to determine the bypass valve setting are:
(1) Gallons per acre desired;
(2) Spacing of nozzles, inches;
(3) Loaded radius of tire, inches;
(4) Drive ratio, revolutions of pump per revolution of ground wheel;
(5) Flow, gallons per minute, of one nozzle or orifice at 10 p.s.i. pressure (from nozzle catalog).

Therefore, another object is to provide a novel centrifugal metering system for liquid agricultural chemicals which is highly effective in accurately applying liquid agricultural chemicals to the ground.

Another object is to provide a novel centrifugal metering system for liquid agricultural chemicals which is effective to apply a predetermined number of gallons of the liquid per acre within a reasonably wide range of speeds of the applicator.

Another object is to provide a novel centrifugal metering system for liquid agricultural chemicals which can be quickly and easily set for the application of a predetermined number of gallons per acre, and which can be reset to deliver another number of gallons per acre simply by changing the setting of a calibrated bypass valve.

Another object of the invention is to provide a novel centrifugal metering system for liquid agricultural chemicals in which the liquid within the supply tank is agitated by the return of liquid thereto, thereby obviating mechanical agitators, or the like.

Other objects are to provide a novel centrifugal metering system for liquid agricultural chemicals which can be used to advantage by a farmer with minimum instructions, which is inexpensive in respect to capital investment, which has a minimum number of moving parts, thereby reducing maintenance costs and breakdowns while in use, which can be readily applied to existing applicator equipment, and which otherwise fulfills the objects and advantages sought therefor.

The foregoing and other objects and advantages are apparent from the following description taken with the accompanying drawing, in which:

The figure is a diagrammatic view of a centrifugal metering system for liquid agricultural chemicals incorporating teachings of the present invention integrated with a wheeled applicator.

Referring to the drawing more particularly by reference numerals, 10 indicates generally a centrifugal metering system constructed in accordance with the teachings of the present invention, which is mounted upon the frame 14 of a diagrammatically illustrated applicator generally designated 16. In addition to the frame 14, the applicator 16 includes a tank 18 for liquid agricultural chemicals, a boom 20 with spray nozzles 22 mounted from the frame 14, and two or more supporting wheels 24. The applicator 16 may be any of many makes presently being used in the agricultural art, which is normally pulled by a tractor through a hitch 26.

The centrifugal metering system 10 includes a centrifugal pump 27, a calibrated dial bypass valve 28, and a rope pull actuated cutoff valve 30, all mounted on the frame 14. Both valves 28 and 30 are connected into the output side of the centrifugal pump 27 by means of a suitable T-connection 32 and pipe segments. The bypass valve 28 is connected into the tank 18 by a return hose 34. The cutoff valve 30 is connected to the boom 20 by a suitable hose 36. A rope 38 is connected to a pivoted shutoff lever 40 of the valve 30 and extends forwardly to within the reach of an operator on a tractor, or the like, by which the applicator 16 is drawn.

The intake side of the centrifugal pump 27 is connected into the tank 18 by a suitable hose 42. A small sprocket 44 is secured to the shaft 46 of the rotor of the centrifugal pump 27. A large sprocket 48 is secured to the wheel 24 for rotation therewith. A chain 50 is trained about the sprockets 44 and 48.

Preferably, the centrifugal pump 27 is of multi-stage construction so that it will develop adequate pressure for dispensing agriculutral chemicals at speeds that are practical to develop from a ground wheel drive. This is essential since there are mechanical limitations in respect to the ratio that can be obtained between the sprockets 44 and 48. In one application of the present invention, the pump 27 is driven from a ground wheel with a 72:17 sprocket ratio, which is about as large as is practical. The sprocket 44 cannot be smaller than sufficient to receive the chain and the sprocket 48 cannot be so large that it may be damaged by stones or debris in the field. Larger ratios can be obtained by use of a gear box with higher impeller speeds, but such high speeds are impractical since many agricultural chemicals contain suspended salt and other solid matter that greatly shorten the life of parts moving at very high speeds. Any centrifugal pump of adequate capacity within required speed ranges may be used in carrying out the present invention, such as the three-stage centrifugal pumps, Models A-520 and A-560, now made by Decatur Foundry and Machine Company, Inc., Decatur, Alabama, which are of large diameter, of closed type and have interstage seals.

The valve 30 may be any shut-off valve. Preferably, the pivoted lever 40 is spring-actuated to open the valve 30 and is manually closed through an operator pulling the rope 38. This of course, can be reversed, but a positive closing action insures shutting off the liquid from the centrifugal pump 27 when it is desired.

The bypass valve 28 is calibrated so that the flow area through the valve is proportional to the dial setting. In effect, the valve 28 is an adjustable control orifice. Any precision calibrated valve may be used, such as the calibrated valve, Model A-889, now made by Decatur Foundry and Machine Company, Inc.

With any selected calibrated valve 28, it is a simple matter to set up a chart for a particular applicator and integrated centrifugal metering system. A typical chart based on the A-880 valve of Decatur Foundry follows:

SPRAY BOOM OUTPUT CHART

[Based on 13.3" loaded radius for 9 nozzles on 40" spacing]

| Valve Dial Setting | Output, Gallons per Acre | | | | | | | | |
|---|---|---|---|---|---|---|---|---|---|
| | KSS-5 Nozzles | | | KSS-10 Nozzles | | | KSS-20 Nozzles | | |
| | 20 Tooth* | 16 Tooth* | 14 Tooth* | 20 Tooth | 16 Tooth | 14 Tooth | 20 Tooth | 16 Tooth | 14 Tooth |
| 100 | 10 | 12.5 | 14 | 18 | 22.5 | 26 | 26.5 | 33 | 39 |
| 80 | 11.5 | 14.5 | 16.5 | 19 | 24 | 27.5 | 29 | 36.5 | 41.5 |
| 60 | 12.5 | 16 | 18 | 21.5 | 26 | 30.5 | 32.5 | 40.5 | 46 |
| 50 | 14 | 17.5 | 20 | 23.5 | 29 | 33.5 | 35.5 | 44.5 | 51 |
| 40 | 15.5 | 19.5 | 22 | 26.5 | 33 | 38 | 39 | 48.5 | 55.5 |
| 30 | 17 | 21.5 | 24.5 | 29 | 36 | 41.5 | 42.5 | 53 | 61 |
| 20 | 18 | 22.5 | 26 | 31 | 39 | 44.5 | 45.5 | 57 | 65 |
| 10 | 19 | 24 | 27 | 34 | 42.5 | 49 | 51 | 63.5 | 72.5 |
| 5 | 20 | 25 | 29 | 34.5 | 43 | 49+ | 52.5 | 65.5 | 75 |

*Jackshaft or rotor sprocket.

Using a chart like that above, the individual employing the equipment simply sets the dial of valve 28 and proceeds with application of the chemicals. The human error is reduced to a minimum.

It is apparent that there has been provided a centrifugal metering system which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

I claim:

1. A metering system for dispensing liquid agricultural chemicals at rates substantially proportional to the ground speeds of an applicator comprising, a combination, a vehicle of the type to operate as a farm vehicle over farm land, actuating means on the vehicle including ground contact means and a shaft connected therewith so that the shaft rotates at a speed that has a predeterminable, but fixed ratio to the ground speed of the vehicle, container means for holding and releasing liquid agricultural chemicals operatively related to and movable with said vehicle, centrifugal pump means on the vehicle having a low-pressure inlet operatively and substantially unrestrictedly connected with said container means and having a high pressure outlet, the pump means having positive drive means connected with the shaft of the actuating means whereby the pump means is positively driven at speeds in constant relation to the ground speed of the vehicle, the pump means being of the type providing an outlet liquid pressure substantially equal to a constant times the square of the pump means' speed, and with the pump means drive as aforesaid, the outlet liquid pressure being likewise equal to a constant times the square of the ground speed of the vehicle, the drive means causing the pump means to operate substantially as soon as the vehicle starts to move, the pump means and the connection between the container means and the pump means being adapted to provide output delivery by the pump means substantially as soon as the pump means starts to operate, liquid discharge orifice means for discharge to the ground of liquid agricultural chemicals, the discharge orifice means being operatively related to and movable with said vehicle, and conduit means connecting said orfice means to said centrifugal pump means outlet for receiving liquid agricultural chemicals therefrom for discharge to the ground, liquid agricultural chemicals as received at the upstream side of said liquid discharge orifice means being at a pressure substantially equal to a constant times the square of the pump means speed, the orifice means being of the type providing liquid discharge through said orifice means that varies substantially as a constant times the square root of the liquid pressure, and because of the pump means and drive arrangement aforesaid, is substantially directly proportional to the ground speed of the vehicle, the amount of liquid discharged per selected ground increment being substantially the same regardless of the speed of the vehicle.

2. The metering system of claim 1, including a bypass from the outlet side of the pump having an unrestricted discharge back to the container means, and a valve in said bypass for controlling the same, the bypass being of a type and cross-section to effect raising and lowering of the pressure on the upstream side of the orifice means determined by the position of the valve.

3. The metering system of claim 2 in which said valve is a calibrated valve and includes a dial arrangement calibrated so that the flow area through said valve is proportional to the dial setting.

4. The metering system of claim 1 and including valve means for closing and opening said conduit means between said pump means and said orfice means.

5. The metering system of claim 1 in which said centrifugal pump means is a centrifugal pump of the large diameter closed multistage multiseal type.

References Cited

UNITED STATES PATENTS

| 841,641 | 1/1907 | Degen | 103—108 |
|---|---|---|---|
| 1,132,095 | 3/1915 | Hutchison | 137—556.6 |
| 2,184,969 | 12/1939 | Allen | 239—157 |
| 2,583,560 | 1/1952 | Gaddis | 239—142 |
| 2,659,625 | 11/1953 | Gramatky | 239—127 |
| 2,662,795 | 12/1953 | Bartling | 239—127 |
| 2,735,669 | 2/1956 | Seiler | 137—556.3 |
| 2,757,044 | 7/1956 | Gerbracht | 239—127 |
| 2,774,626 | 12/1956 | Gerbracht | 239—157 |
| 3,044,712 | 7/1962 | Tanke | 239—127 |
| 3,143,295 | 8/1964 | Booker | 239—127 |

FOREIGN PATENTS

| 161,605 | 3/1955 | Australia. |
|---|---|---|
| 2,178 | 1912 | Great Britain. |

M. HENSON WOOD, Jr., *Primary Examiner.*

VAN C. WILKS, *Assistant Examiner.*